(12) United States Patent
Thompson et al.

(10) Patent No.: US 9,151,162 B2
(45) Date of Patent: Oct. 6, 2015

(54) PREVENTING ROTATION OF A FIXED RING OF A SWASHPLATE

(71) Applicant: Bell Helicopter Textron Inc., Fort Worth, TX (US)

(72) Inventors: George M. Thompson, Irving, TX (US); Frank B. Stamps, Colleyville, TX (US); Glenn A. Shimek, Kennedale, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 422 days.

(21) Appl. No.: 13/672,309

(22) Filed: Nov. 8, 2012

(65) Prior Publication Data
US 2014/0124615 A1 May 8, 2014

(51) Int. Cl.
*B64C 27/605* (2006.01)
*F01D 5/02* (2006.01)

(52) U.S. Cl.
CPC ............... *F01D 5/02* (2013.01); *B64C 27/605* (2013.01)

(58) Field of Classification Search
CPC ...... B64C 27/605; B64C 27/59; B64C 27/58; B64C 27/52; B64C 2027/7238; B64C 2027/7255
See application file for complete search history.

(56) References Cited

U.S. PATENT DOCUMENTS

| | | | |
|---|---|---|---|
| 4,375,940 A | * | 3/1983 | Lovera et al. ................. 416/114 |
| 6,033,182 A | * | 3/2000 | Rampal ...................... 244/17.25 |
| 6,074,168 A | | 6/2000 | Rampal et al. |
| 6,102,659 A | | 8/2000 | Rampal |
| 6,149,386 A | * | 11/2000 | Rampal ........................ 416/114 |
| 6,152,696 A | * | 11/2000 | Rampal ........................ 416/114 |
| 6,325,326 B1 | | 12/2001 | Pancotti |

FOREIGN PATENT DOCUMENTS

EP    1031509 A2    8/2000

OTHER PUBLICATIONS

European Search Report in related European Application No. 12198685.5, dated May 17, 2013, 5 pages.
71.3 Communication in related European Application No. 12198685.5, dated Dec. 17, 2014, 24 pages.

* cited by examiner

*Primary Examiner* — Tien Dinh
*Assistant Examiner* — Richard R Green
(74) *Attorney, Agent, or Firm* — Bell Helicopter Textron Inc.

(57) ABSTRACT

According to one embodiment, a rotor system includes an anti-rotation sleeve featuring an outer recess portion and a tilt sleeve positioned about the anti-rotation sleeve and having an opening therethrough. A first swashplate ring is positioned about the tilt sleeve and features an inner recess portion. An anti-rotation mechanism is disposed through the opening and at least partially in the outer recess portion and the inner recess portion. The anti-rotation mechanism is operable to prevent the first swashplate ring from rotating about the anti-rotation sleeve. A second swashplate ring is positioned about the first swashplate ring and rotatable about the anti-rotation sleeve.

16 Claims, 6 Drawing Sheets

PREVENTING ROTATION OF A FIXED RING OF A SWASHPLATE

TECHNICAL FIELD

This invention relates generally to rotor systems, and more particularly, to preventing rotation of a fixed ring of a swashplate.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to prevent rotation of a non-rotating swashplate ring while allowing the non-rotating swashplate ring to still tilt and slide. A technical advantage of one embodiment may also include the capability to prevent the non-rotating swashplate ring from rotating while allowing the rotating swashplate ring to rotate with the rotor blades. A technical advantage of one embodiment may include the capability to reduce the height of the aircraft and the diameter of the swashplate of a rotor system thereby reducing the empty weight of the aircraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
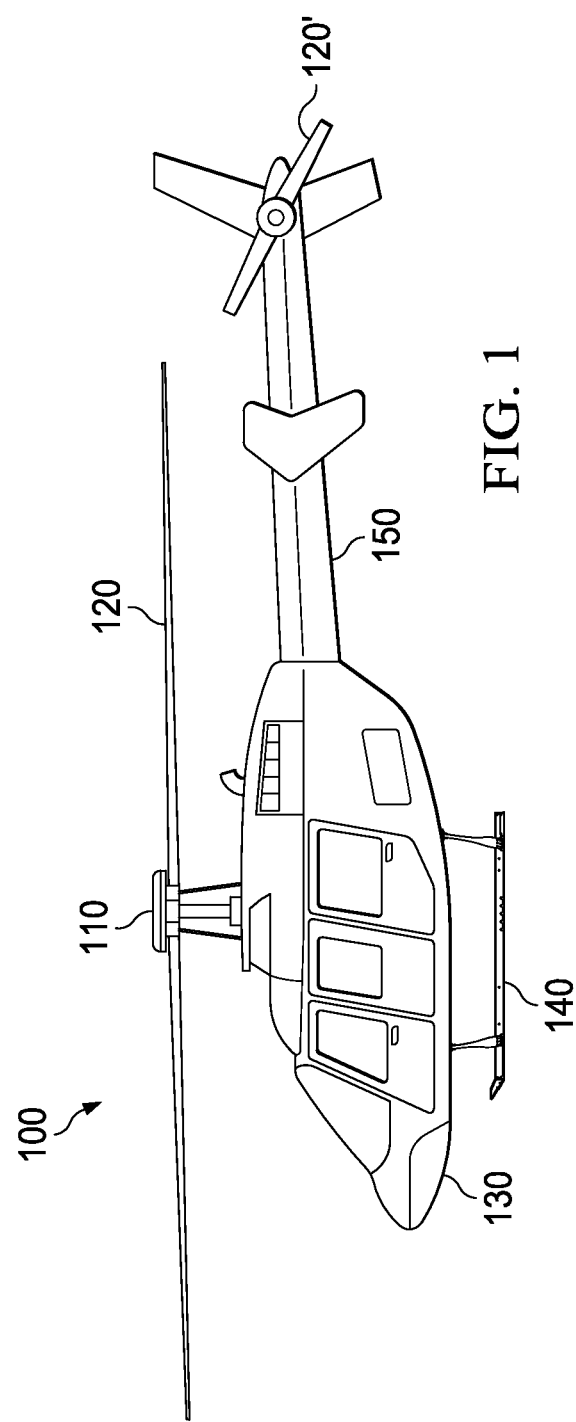
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
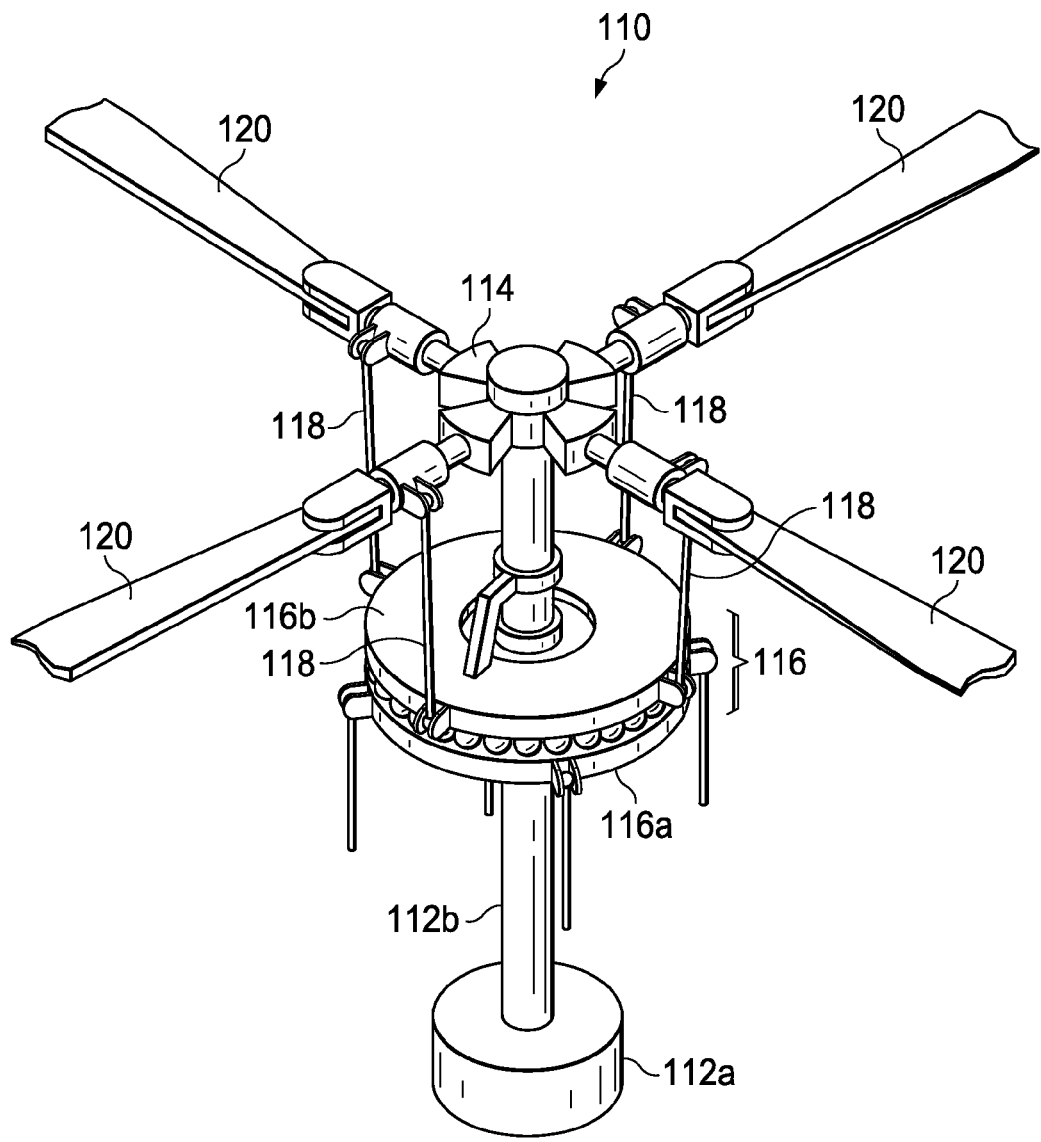
FIG. 2 shows an example helicopter rotor assembly that may be incorporated into a rotorcraft such as the rotorcraft of FIG. 1.

FIG. 2 shows rotor system 110 and blades 120 of FIG. 1 according to one example embodiment. In the example of FIG. 2, rotor system 110 features a power train 112, a hub 114, a swashplate 116, and pitch links 118. In some examples, rotor system 110 may include more or fewer components. For example, FIG. 2 does not show components such as a gearbox, a swash plate, drive links, drive levers, and other components that may be incorporated.

Power train 112 features a power source 112a and a drive shaft 112b. Power source 112a, drive shaft 112b, and hub 114 are mechanical components for transmitting torque and/or rotation. Power train 112 may include a variety of components, including an engine, a transmission, and differentials. In operation, drive shaft 112b receives torque or rotational energy from power source 112a and rotates hub 114. Rotation of rotor hub 114 causes blades 120 to rotate about drive shaft 112b.

Swashplate 116 translates rotorcraft flight control input into motion of blades 120. Because blades 120 are typically spinning when the rotorcraft is in flight, swashplate 116 may transmit flight control input from the non-rotating fuselage to the hub 114, blades 120, and/or components coupling hub 114 to blades 120 (e.g., grips and pitch horns). References in this description to coupling between a pitch link and a hub may also include, but are not limited to, coupling between a pitch link and a blade or components coupling a hub to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally.

In the example of FIG. 2, non-rotating swashplate ring 116a should not rotate with drive shaft 112b, whereas rotating swashplate ring 116b should rotate with drive shaft 112b. Teachings of certain embodiments provide the capability to prevent a non-rotating swashplate ring from rotating while allowing the rotating swashplate ring to rotate with the rotor blades. A particular embodiment is described below with regard to FIGS. 3 through 8.

Figure 3:
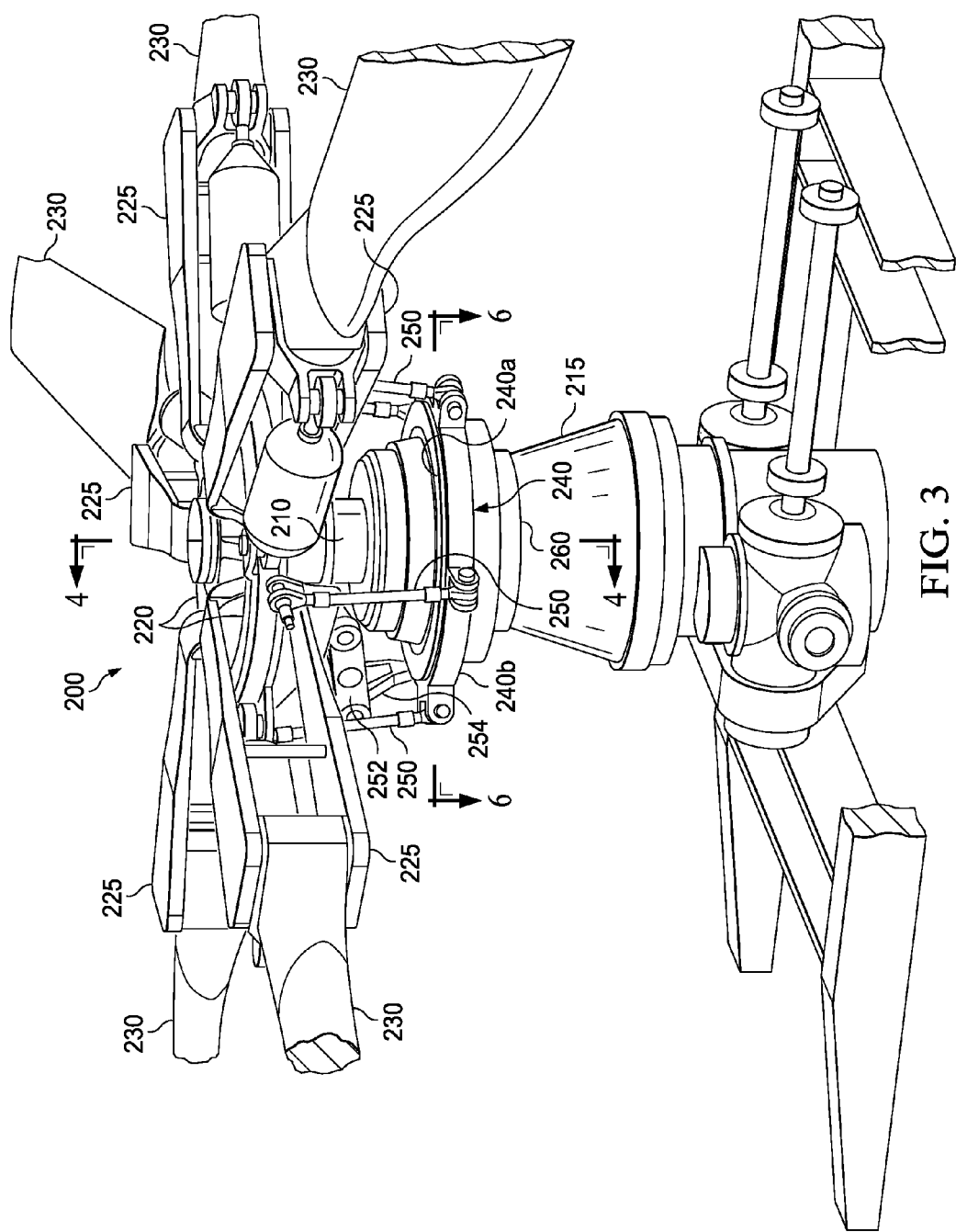
FIG. 3 shows an example helicopter rotor assembly according to one example embodiment that may be incorporated into a rotorcraft such as the rotorcraft of FIG. 1.

FIG. 3 shows a rotor system 200 according to one example embodiment. Rotor system 200 features a drive shaft 210, an anti-rotation sleeve 215, a yoke 220, grips 225, blades 230, a swashplate 240 having a non-rotating swashplate ring 240a and a rotating swashplate ring 240b, pitch links 250, drive levers 252, drive links 254, and a tilt sleeve 260. Additional details of rotor system 200 are described in greater detail with regard to FIGS. 4-8.

Drive shaft 210, yoke 220, grips 225, drive levers 252, and drive links 254 are mechanical components for transmitting torque and/or rotation. In rotor system 200, grips 225 couple blades 230 to yoke 220, which is coupled to drive shaft 210. Drive levers 252 and drive links 254 couple yoke 220 to rotating swashplate ring 240b. In operation, drive shaft 210 receives torque or rotational energy and rotates yoke 220. Rotation of yoke 220 causes grips 225 to rotate blades 230 and causes drive levers 252 and drive links 254 to rotate rotating swashplate ring 240b.

Swashplate 240 translates flight control input into motion of blades 230. Because blades 230 are typically spinning when the helicopter is in flight, swashplate 240 may transmit flight control input from the non-rotating fuselage to the rotating yoke 220, grips 225, and/or blades 230. Swashplate 240 includes a non-rotating swashplate ring 240a and a rotating swashplate ring 240b. Non-rotating swashplate ring 240a and rotating swashplate ring 240b are shown in greater detail with regard to FIGS. 4-7. Non-rotating swashplate ring 240a does not rotate with drive shaft 210, whereas rotating swashplate ring 240b does rotate with drive shaft 210. Rotating swashplate ring 240b may be coupled to blades 230 via pitch links 250, which allow rotating swashplate ring 240b to control deflection of blades 230. In operation, translating or tilting non-rotating swashplate ring 240a causes rotating swashplate ring 240b to translate or tilt, which in turn moves pitch links 250 up and down.

Tilt sleeve 260 is coupled to and around anti-rotation sleeve 215. In the illustrated embodiment, the interior surface of tilt sleeve 260 is substantially cylindrical. Anti-rotation sleeve 215 surrounds drive shaft 210 and separates rotating drive shaft 210 from non-rotating components such as tilt sleeve 260 and non-rotating swashplate ring 240a. In some embodiments, anti-rotation sleeve 215 is coupled to and/or incorporated into the gearbox of rotor system 200.

Anti-rotation sleeve 215 prevents non-rotating swashplate ring 240a from rotating with drive shaft 210. In some embodiments, using anti-rotation sleeve 215 to prevent rotating of non-rotating swashplate ring 240a may allow for a shorter rotor system 200. For example, in some embodiments, anti-rotation sleeve 215 may eliminate the need to externally couple non-rotating swashplate ring 240a directly to the gearbox.

Figure 4:
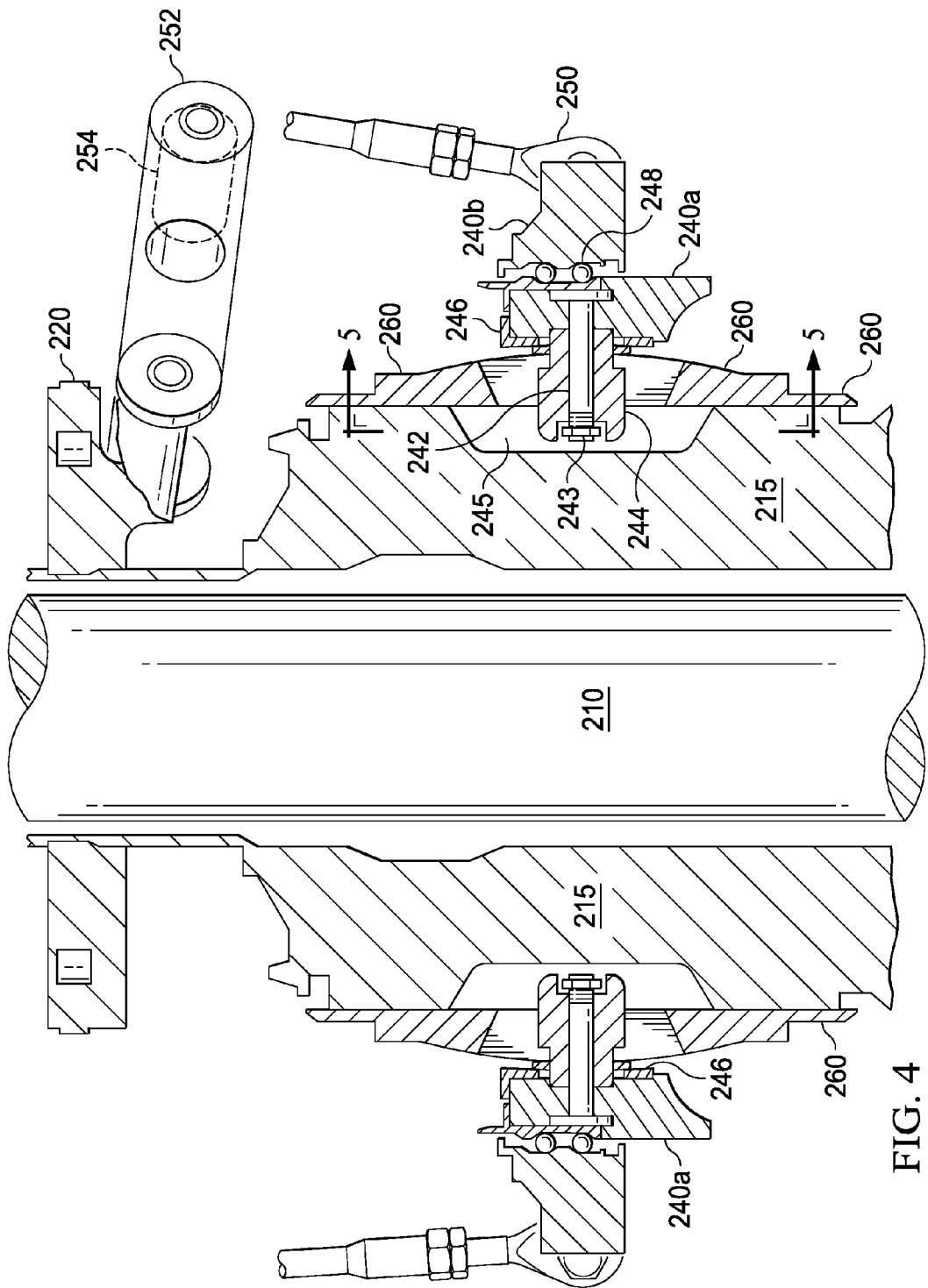
FIG. 4 shows a longitudinal cross-section of the rotor system of FIG. 3.

FIG. 4 shows a longitudinal cross-section of the rotor system 200 of FIG. 3. As shown in FIG. 4, a pin 242, a nut 243, and a key 244 provide an anti-rotation mechanism between non-rotating swashplate ring 240a and anti-rotation sleeve 215. In operation, anti-rotation sleeve 215 prevents rotation of swashplate ring 240a about drive shaft 210. Anti-rotation sleeve 215 may also allow the anti-rotation mechanism to move longitudinally up and down slot portion 245 in anti-rotation sleeve 215, which may allow for longitudinal movement of swashplate 240.

Non-rotating swashplate ring 240a is positioned around tilt sleeve 260 and anti-rotation sleeve 215. In the example of FIG. 4, pin 242 and key 244 prevent non-rotating swashplate ring 240a from rotating about the longitudinal axis of drive shaft 210 while allowing it to tilt. In this example, key 244 fits within slot portions 245 in anti-rotation sleeve 215 and tilt sleeve 260. Key 244 is configured to receive pin 242. Nut 243 holds key 244 against pin 242. In some embodiments, nut 243 is not tightened against key 244, but rather pin 242 is allowed to move somewhat relative to key 244.

Non-rotating swashplate ring 240a also includes an opening configured to receive key 244 such that key 244 prevents non-rotating swashplate ring 240a from rotating relative. In the example of FIG. 4, key 244 features a cylindrical bore portion that fits in a counter bore in non-rotating swashplate ring 240a. Pin 242 and key 244 are shown in greater detail in FIGS. 6-8.

Tilt sleeve 260 may include a curved outer surface. This curved outer surface, also known as a "tilt ball," allows swashplate 240 to tilt relative to the curved outer surface. As stated above, tilting non-rotating swashplate ring 240a causes rotating swashplate ring 240b to tilt, which in turn moves pitch links 250 up and down and deflects blades 230. Thus, teachings of certain embodiments recognize the capability to prevent rotation of non-rotating swashplate ring 240a while allowing tilting of non-rotating swashplate ring 240a relative to the tilt ball of tilt sleeve 260.

Bearing 246 separates tilt sleeve 260 and non-rotating swashplate ring 240a. In some embodiments, bearing 246 may prevent non-rotating swashplate ring 240a from wearing against tilt sleeve 260. Bearing 246 may be made of any suitable bearing material, such as Teflon.

Rotating swashplate ring 240b is positioned around non-rotating swashplate ring 240a. Bearing 248 separates rotating swashplate ring 240b from non-rotating swashplate ring 240a to prevent wearing and to reduce friction when rotating swashplate ring 240b rotates relative to non-rotating swashplate ring 240a. In operation, rotating swashplate ring 240b rotates with drive levers 252 and drive links 254. Rotating swashplate ring 240b also tilts with non-rotating swashplate ring 240a as non-rotating swashplate ring 240a tilts relative to the curved surface of tilt sleeve 260.

Figure 5:
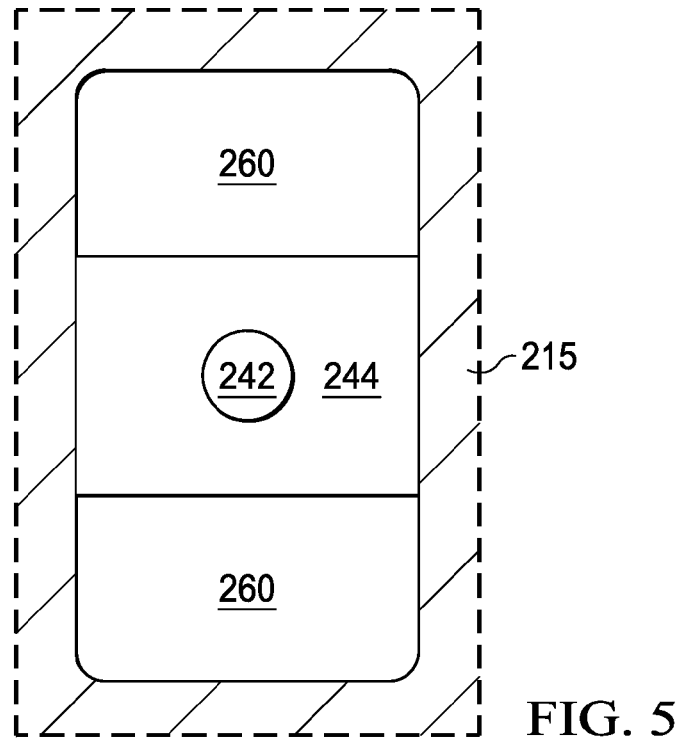
FIG. 5 shows a partial cross-section of an anti-rotation mechanism of the rotor system of FIG. 3.

FIG. 5 shows a cross-section of slot portion 245 in anti-rotation sleeve 215 and tilt sleeve 260. As seen in FIG. 5, key 244 fits within slot portion 245. Slot portion 245 is sized so as to prevent lateral movement of key 244 but allow for longitudinal movement of key 244. In this manner, slot portion 245 may prevent rotation of non-rotating swashplate ring 240a but allow for tilting of non-rotating swashplate 240a along tilt sleeve 260.

Figure 6:
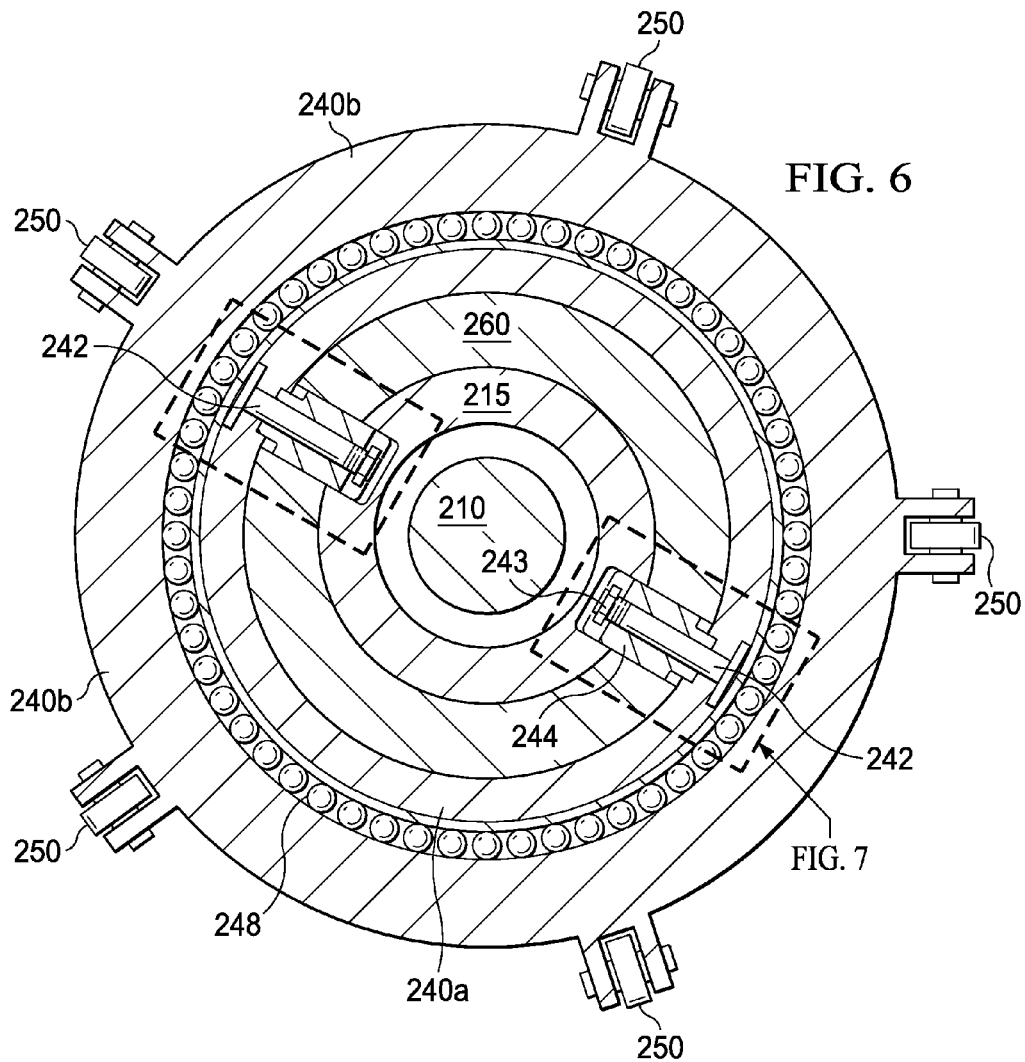
FIG. 6 shows a transverse cross-section of the rotor system of FIG. 3.

FIG. 6 shows a transverse cross-section of the rotor system 200 of FIG. 2. As shown in FIG. 6, anti-rotation sleeve 215 surrounds drive shaft 210. Tilt sleeve 260 is coupled to and around anti-rotation sleeve 215. Non-rotating swashplate ring 240a is positioned around tilt sleeve 260. Pin 242 and key 244 prevent non-rotating swashplate ring 240a from rotating around anti-rotation sleeve 215. Rotating swashplate ring 240b is positioned around non-rotating swashplate ring 240a and is free to rotate along bearings 248.

Figure 7:
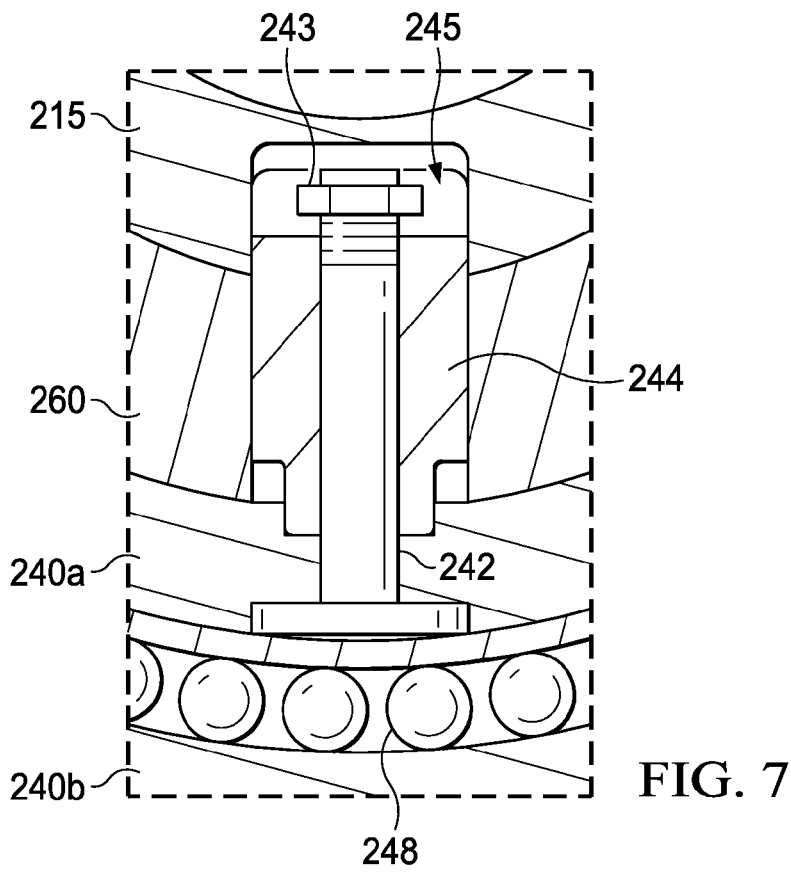
FIG. 7 shows a close view of the transverse cross-section of FIG. 6.

FIG. 7 shows a close view of the transverse cross-section of FIG. 6. As shown in FIG. 7, pin 242 and key 244 prevent non-rotating swashplate ring 240a from rotating around anti-rotation sleeve 215 and tilt sleeve 260. Key 244 fits within slot portion 245 of anti-rotation sleeve 215 and tilt sleeve 260. Pin 242 extends through non-rotating swashplate ring 240a and key 244. Nut 243 bolts pin 242 to key 244 and thus secures key 244 against non-rotating swashplate ring 240a.

In some embodiments, the mating surfaces of anti-rotation sleeve 215 and/or tilt sleeve 260 may be treated with a bearing coating to reduce wear and friction between the parts. For example, anti-rotation sleeve 215 and/or tilt sleeve 260 may be anodized. Anodization is an electrolytic passivation process used to increase the thickness of the natural oxide layer on the surface of metal parts. In one example embodiment, anti-rotation sleeve 215 and/or tilt sleeve 260 may be treated using a process called Keronite, which may produce a hard, dense ceramic surface layer on anti-rotation sleeve 215 and/or tilt sleeve 260.

Figure 8:
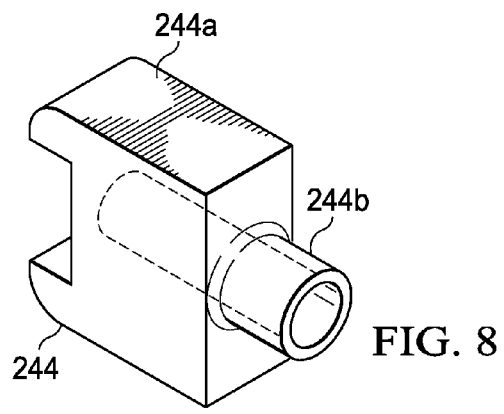
FIG. 8 shows an isometric view of the key of FIGS. 4-7.

FIG. 8 shows an isometric view of key 244 according to one example embodiment. In the example of FIG. 8, key 244 features a body portion 244a and a cylindrical bore 244b. In this example, body portion 244a may fit within slot portion 245 of anti-rotation sleeve 215 and tilt sleeve 260, and cylindrical bore 244b may fit in a counter bore in non-rotating swashplate ring 240a. In addition, pin 242 may reside in an opening through body portion 244a and cylindrical bore 244b.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
    a body;
    a power train coupled to the body and comprising a power source and a drive shaft coupled to the power source;
    a gearbox surrounding a portion of the drive shaft;
    a hub;
    a rotor blade coupled to the hub;
    an anti-rotation sleeve coupled to the gearbox and featuring an outer recess portion;
    a tilt sleeve positioned about the anti-rotation sleeve and having an opening therethrough, wherein the tilt sleeve is configured to slide in a strictly axial direction relative to the anti-rotation sleeve;
    a first swashplate ring positioned about the tilt sleeve and featuring an inner recess portion;
    an anti-rotation mechanism disposed through the opening and at least partially in the outer recess portion and the inner recess portion, the anti-rotation mechanism operable to prevent the first swashplate ring from rotating about the anti-rotation sleeve, the anti-rotation mechanism comprising:
        a pin disposed through the opening and at least partially in the outer recess portion and the inner recess portion;
        a key disposed at least partially in the outer recess portion and the opening and configured to receive the pin; and
        a nut at least partially disposed in the outer recess portion and coupling the pin to the key; and
    a second swashplate ring positioned about the first swashplate ring and rotatable about the anti-rotation sleeve with rotation of the plurality of rotor blades.

2. The rotorcraft of claim 1, wherein:
    the tilt sleeve comprises a curved surface; and
    the first swashplate ring is pivotable along the curved surface.

3. The rotorcraft of claim 1, wherein the key abuts the first swashplate ring.

4. The rotorcraft of claim 1, wherein the outer recess portion is an elongated slot.

5. The rotorcraft of claim 1, wherein the key abuts a surface of the anti-rotation sleeve that at least partially defines the outer recess portion.

6. The rotorcraft of claim 1, wherein the anti-rotation sleeve is coupled to the gearbox such that the anti-rotation sleeve does not move relative to the gearbox.

7. A rotor system, comprising:
    an anti-rotation sleeve featuring an outer recess portion;
    a tilt sleeve positioned about the anti-rotation sleeve and having an opening therethrough, wherein the tilt sleeve is configured to slide in a strictly axial direction relative to the anti-rotation sleeve;
    a first swashplate ring positioned about the tilt sleeve and featuring an inner recess portion;
    an anti-rotation mechanism disposed through the opening and at least partially in the outer recess portion and the inner recess portion, the anti-rotation mechanism operable to prevent the first swashplate ring from rotating about the anti-rotation sleeve, the anti-rotation mechanism comprising:
        a pin disposed through the opening and at least partially in the outer recess portion and the inner recess portion;
        a key disposed at least partially in the outer recess portion and the opening and configured to receive the pin; and
        a nut at least partially disposed in the outer recess portion and coupling the pin to the key; and
    a second swashplate ring positioned about the first swashplate ring and rotatable about the anti-rotation sleeve.

8. The rotor system of claim 7, further comprising a gearbox, wherein the anti-rotation sleeve is coupled to the gearbox.

9. The rotor system of claim 7, wherein:
    the tilt sleeve comprises a curved surface; and
    the first swashplate ring is pivotable along the curved surface.

10. The rotor system of claim 7, wherein the key abuts the first swashplate ring.

11. The rotor system of claim 7, wherein the outer recess portion is an elongated slot.

12. The rotor system of claim 7, wherein the key abuts a surface of the anti-rotation sleeve that at least partially defines the outer recess portion.

13. The rotor system of claim 7, wherein the tilt sleeve is coupled to a gearbox such that the anti-rotation sleeve does not move relative to the gearbox.

14. A method of preventing rotation a fixed ring of a swashplate, comprising:
    maintaining a tilt sleeve positioned about an anti-rotation sleeve, the anti-rotation sleeve featuring an outer recess portion, the tilt sleeve having an opening therethrough, the tilt sleeve being configured to slide in a strictly axial direction relative to the anti-rotation sleeve;

maintaining a first swashplate ring positioned about the tilt sleeve, the first swashplate ring featuring an inner recess portion;

providing an anti-rotation mechanism disposed through the opening and at least partially in the outer recess portion and the inner recess portion, the anti-rotation mechanism operable to prevent the first swashplate ring from rotating about the anti-rotation sleeve, the anti-rotation mechanism comprising:

a pin disposed through the opening and at least partially in the outer recess portion and the inner recess portion;

a key disposed at least partially in the outer recess portion and the opening and configured to receive the pin; and a nut at least partially disposed in the outer recess portion and coupling the pin to the key;

maintaining a second swashplate ring rotatable about the first swashplate ring; and preventing the first swashplate ring from rotating about the anti-rotation sleeve by maintaining an anti-rotation mechanism disposed through the opening and at least partially in the outer recess portion and the inner recess portion.

15. The method of claim 14, further comprising rotating the second swashplate ring about the first swashplate ring.

16. The method of claim 14, wherein the tilt sleeve comprises a curved surface, the method further comprising pivoting the first swashplate ring along the curved surface.

\* \* \* \* \*